United States Patent [19]
Greenberg

[11] 3,951,727
[45] Apr. 20, 1976

[54] DELAMINATING METHOD AND APPARATUS

[76] Inventor: William B. Greenberg, 211 Rock Hill Road, Bala Cynwyd, Pa. 19004

[22] Filed: May 28, 1974

[21] Appl. No.: 473,518

Related U.S. Application Data

[63] Continuation of Ser. No. 269,411, July 6, 1972, abandoned.

[52] U.S. Cl. .................. 156/584; 29/202.5; 29/239; 51/406; 81/9.5 R; 156/344
[51] Int. Cl.² .................................. B32B 31/18
[58] Field of Search ............... 156/344, 154, 584; 81/9.51, 9.5 R, 9.5 C; 51/401, 406, 407, 209 R; 29/200 D, 202.5, 239, 240

[56] References Cited
UNITED STATES PATENTS

| | | | |
|---|---|---|---|
| 128,387 | 6/1872 | Gyles | 144/320 |
| 1,409,001 | 3/1922 | Hurter | 29/123 |
| 1,954,817 | 4/1934 | Jenkins | 83/425 |
| 2,434,640 | 1/1948 | Burdwood | 83/430 |
| 2,882,188 | 4/1959 | Levin et al. | 134/9 |
| 2,951,403 | 9/1960 | Bunch et al. | 81/9.51 |
| 2,977,831 | 4/1961 | Bunch | 81/9.51 |
| 3,175,430 | 3/1965 | Smith et al. | 81/9.51 |
| 3,385,140 | 5/1968 | Carpenter et al. | 81/9.51 |

*Primary Examiner*—Edward G. Whitby

[57] ABSTRACT

A delaminating method and apparatus wherein a laminated assembly of generally flat strips is passed between rotary pressure members having different speeds and surface characteristics to simultaneously apply localized compressive and shear forces to effect delamination of the assembly. The term "delaminating" is used broadly herein to include both separating and the reduction of adherence or bonding tenacity between strips of the assembly without actual separation.

5 Claims, 3 Drawing Figures

U.S. Patent    April 20, 1976    3,951,727
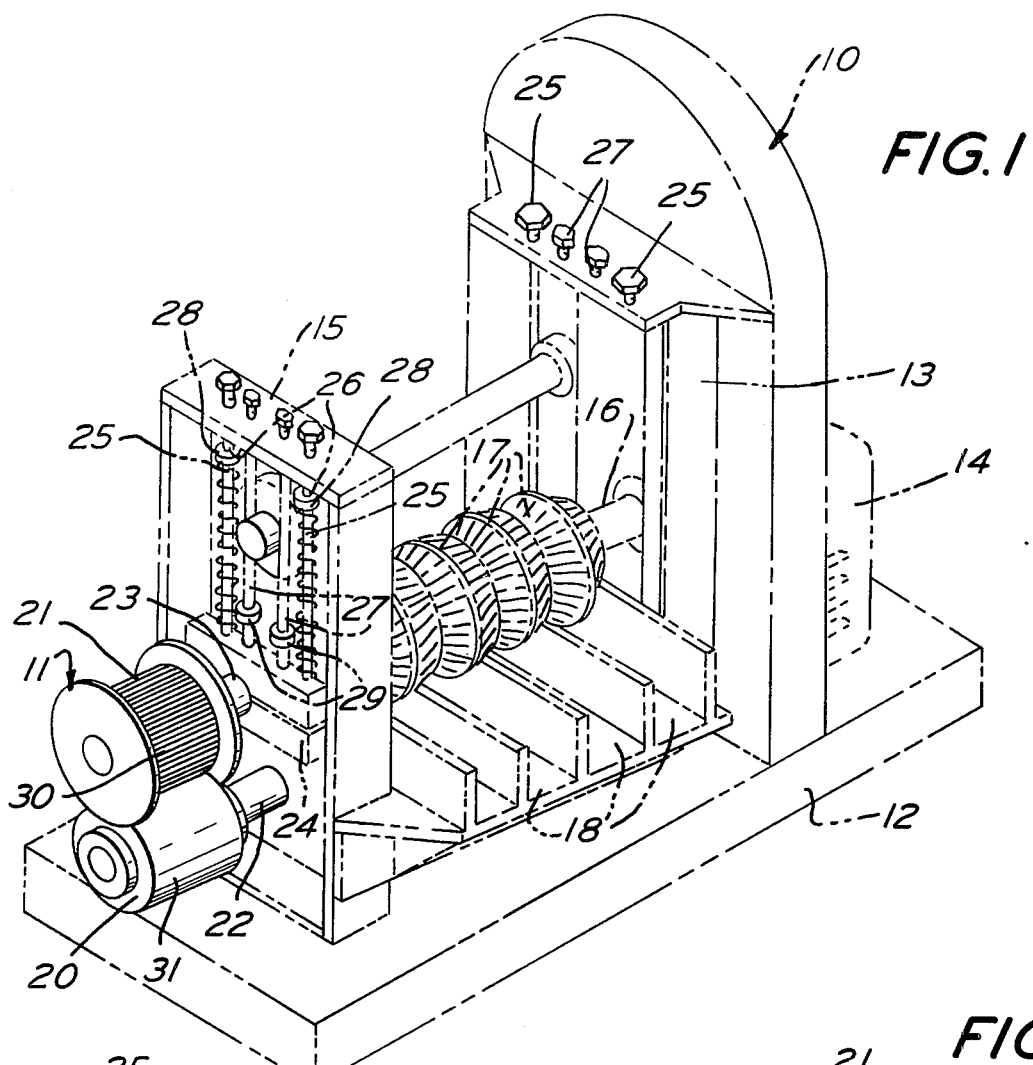
FIG.1
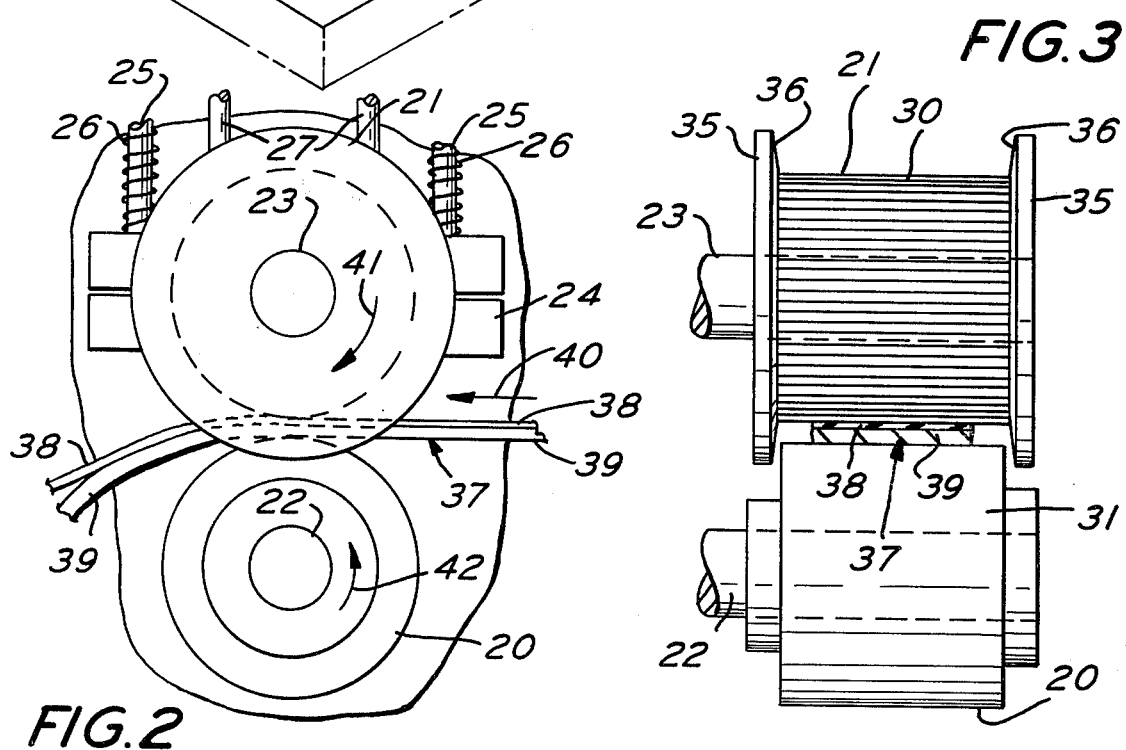
FIG.2
FIG.3

DELAMINATING METHOD AND APPARATUS

CROSS-REFERENCES TO RELATED APPLICATIONS

This is a Continuation of my copending patent application Ser. No. 269,411, filed July 6, 1972 now abandoned.

BACKGROUND OF THE INVENTION

While the instant delaminating method and apparatus have arisen in the field of cable stripping, as when insulation is removed from cable in scrapping operations, it is appreciated that the advantages of the delaminating method and apparatus disclosed herein are capable of broad application in many areas, all of which are intended to be comprehended herein. Thus, while the following description and illustration is more particularly directed to cable stripping, say in delaminating a sheath of lead or the like from rubber, plastic or similar insulation, it is understood that such disclosure is by way of illustration and without limiting intent.

Heretofore, cable stripping procedures have involved either the cutting of a covering or sheath to permit its falling away from a contained conductor, or squeezing of the cable to rip, tear or sever the surrounding insulation from the inner core or conductor. However, certain types of cable construction, such as those having lead sheathing over rubber or plastic insulation, have resisted separation of the metal from the insulation, there being a highly intimate and adherent bond or lamination therebetween.

SUMMARY OF THE INVENTION

It is, therefore, an important object of the present invention to provide a delaminating method and apparatus which is extremely simple in operation and structure, and highly effective to separate or delaminate even very intimately adhesively secured laminated assemblies.

It is a further object of the present invention to provide a delaminating method and apparatus having the advantageous characteristics mentioned in the preceding paragraph, which are admirably well suited for a wide variety of applications, and which utilize a unique combination of localized compression and shear force applied to the lamina.

It is still another object of the present invention to provide a method and apparatus for delaminating or facilitating the separation of laminated, substantially flat strips, such as strips of lead and rubber or the like, which have been previously cut and stripped from cable.

Other objects of the present invention will become apparent upon reading the following specification and referring to the accompanying drawings, which form a material part of this disclosure.

The invention accordingly consists in the features of construction, combinations and arrangements of parts and method steps, which will be exemplified in the following description, and of which the scope will be indicated by the appended claims.

BRIEF DESCRIPTION OF THE DRAWINGS

FIG. 1 is a top perspective view showing a delaminating apparatus of the present invention in operative association with a cable stripping device, the latter being shown in phantom.

FIG. 2 is an end elevational view of the delaminating apparatus of the instant invention.

FIG. 3 is a side elevational view, say from the right-hand side of FIG. 2, illustrating a laminated assembly being fed into the delaminating apparatus.

DESCRIPTION OF THE PREFERRED EMBODIMENT

Referring now more particularly to the drawings, and specifically to FIG. 1 thereof, a cable stripping device is there generally designated 10, and has applied thereto delaminating apparatus of the present invention generally designated 11. The cable stripping device 10, except that part proximate to the delaminating apparatus 11 is shown in phantom, and may include a base 12, a standard 13 and a suitable power drive or motive means 14.

Spaced from the standard 13 and upstanding from the base 12 may be an additional standard 15, and a pair of upper and lower rotary shafts extend between the standards 13 and 15 each carrying a plurality of rotary cutter wheels, only the upper shaft 16 and its cutter wheels 17 being shown in the drawing. In front of the several wheels 17 may be several guide troughs, as at 18, for guiding different size cables into stripping relation with respective cutters 17. As thus far described, the structure may be essentially conventional.

The delaminating apparatus 11 is outboard of or outwardly beyond the standard 15, being suitably mounted thereon. More particularly, the delaminating apparatus may include a pair of generally tangential, lower and upper rotary members or rolls 20 and 21. One of the rolls or rotary members 20 and 21, say the lower member 20, may be relatively smooth of generally cylindrical configuration and axially rotatably carried by a generally horizontal shaft 22, which may be suitably journaled in the standard 15.

The other rotary member or roll 21 may be carried by a shaft 23 for rotation about a generally horizontal axis. The shaft 23 is rotatably supported by journal means or blocks 24, which journal means or bearings are carried in the standard 15 by generally vertical mounting members or rods 25 extending upwardly from the journal blocks slidably through the upper wall of the standard. Thus, the mounting means or rods 25 and 27 serve to mount the journal means or blocks 24, and thereby the rotary shaft 23 and its rotary member or roll 21 for vertical adjustment toward and away from the nether rotary member or roll 20. Resilient means, such as coil compression springs 26 circumposed about rods 25, may be employed to resiliently urge the journal blocks 24 and roll 21 downwardly toward the roll 20. A collar 28 may be provided on each rod 25, and movable vertically therewith upon rotational threaded engagement of the rods with the standard 15, to selectively determine the resilient force of the springs 26. The inner rods 27 are also threadedly engaged in the standard 15 and carry collars or abutments 29 for adjustably limiting engagement with the journal blocks 24, to positively limit the opening of the nip between rolls 20 and 21. The standard 13 may include journal means and mounting members similar to or the same as journal means 24 and mounting members 25 and 27.

The overhanging stub shaft 23 may be an extension or coupled to the shaft 16, or otherwise operatively connected in driven relation with the motive means 14. Similarly, the overhanging stub shaft 22 is a shaft extension also suitably connected in driven relation with the motive means. Further, the shafts 22 and 23 are connected to the motive means 14 or other suitable motive means to drive the rolls 20 and 21 at predetermined speeds.

It has been found that the rolls 20 and 21 are advantageously driven in opposite angular directions, as when viewed from the same end, and at angular speeds so as to make their peripheral or surface speeds different from each other. That is, the rolls 20 and 21 are each positively controlled as to speed and maintained at different surface speeds.

It will be seen from FIGS. 1 and 3, that one of the rotary members or rolls 20, 21, say the latter, is formed with a relatively rough peripheral surface, as by knurling 30 extending transversely across the peripheral surface of the roll. That is, the periphery of the roll 21 may be formed with knurling 30 defined by generally straight ribs extending longitudinally of the roll in parallelism with the axis thereof and separated by interposed grooves. The knurling or ribs 30 are longitudinally coextensive with the peripheral surface of the roll 21.

In contrast, the peripheral surface 31 of the roll 20 may be relatively smooth, as compared to the roughened, knurled surface 30. Both rolls and their surfaces 30 and 31 are advantageously of relatively hard material, such as metal. Also, as best seen in FIG. 3, both rolls 20 and 21 may be coextensive with each other and disposed in generally parallel, substantially tangential and longitudinally coterminus relation.

Provided on opposite ends of one rotary member or roll, as on opposite ends of roughened roll 21, may be a pair of circumferentially extending, radially projecting flanges, rims or shoulders 35, which project sufficiently to overlap respective opposite ends of the other rotary member or roll 20. Further, the annular flanges or rims 35 are each located in facing abutment with respective end of rotary member or roll 21, so as to define a sharp corner therewith, and may be formed on its inner face with a generally conical surface, as at 36, so that the interflange space opens or flares in the radially outward direction with respect to the rotary member 21. This flaring of the interflange space, or radially outward tapering of the respective flanges serves to permit of slight roller out-of-parallelism or cocking without jamming of the rolls, as might be caused by use of the cutters 17. Thus, the restraining action of the flanges 35 in guiding elongate strips of laminate through the nip of rolls 20, 21 is obtained without disadvantages.

In FIGS. 2 and 3 there is illustrated an elongate strip of laminate 37, say including a layer of plastic or rubber 38 intimately bonded to a layer of lead 39, and moving in the direction of arrow 40. The rotary members 20 and 21 are positively driven in the opposite angular directions of arrows 41 and 42, it being found advantageous to drive the smoother roll 20 at a higher surface speed than the rougher roll 21.

A length of assembled laminate 37 is fed endwise between the rotating rolls 20 and 21, as with the harder material, say the lead, toward the smoother roll and the softer rubber or plastic toward the knurled roll. Upon passing through the nip of rolls 20 and 21, a relatively highly localized compressive force is exerted upon the laminate assembly 37 by the urgence of the rolls 20 and 21 toward each other; and simultaneously, there is imparted to the laminate assembly a shearing force by reason of the different or relative surface speeds of the rolls contacting the workpiece. Exiting from the nip between rolls 20 and 21, see FIG. 2, it will be apparent that the laminae 38 and 39 have delaminated and separated from each other. While total separation between laminae does not always occur by itself, the intimate bond is broken so that separation may be readily effected.

From the foregoing it is seen that the present invention provides a delaminating method and apparatus which fully accomplish their intended objects and are well adapted to meet practical conditions of manufacture, maintenance and use.

Although the present invention has been described in some detail by way of illustration and example for purposes of clarity of understanding, it is understood that certain changes and modifications may be made within the spirit of the invention.

What is claimed is:

1. Delaminating apparatus for separating or reducing the bond tenacity of intimately adherent substantially flat laminated strips in facing engagement with each other having different physical characteristics, said apparatus comprising a pair of generally tangent rotary members, each of said rotary members being of generally constant cross-sectional configuration between its opposite ends, journal means mounting said rotary members for rotation, mounting means mounting said journal means for movement away from and toward each other, pressure applying means for urging the mounting means toward each other to apply force to laminated strips between said rotary members sufficient to permanently deform one laminated strip beyond its elastic limit and not the adjacent laminated strip, drive means for driving each of said rotary members in opposite directions at different surface speeds, knurling on the periphery of one of said rotary members extending transversely thereacross, the periphery of the other of said rotary members being relatively smooth, and circumferential flange means on the opposite ends of at least one of said rotary members projecting radially therefrom to overlap opposite ends of the other rotary member with the rotary members spaced to positively contain the strips being operated upon against lateral movement from the nip of said rotary members, whereby a substantially flat laminated assembly is fed between said rotary members in compressive and shear forces to effect delamination by differential deformation without pushing one lamination through the other.

2. Delaminating apparatus according to claim 1, in combination with adjustment means operatively associated with said mounting means for positively limiting the spacing between said rotary members.

3. Delaminating apparatus according to claim 1, said knurling comprising ribs extending generally longitudinally of said one rotary member axis.

4. Delaminating apparatus according to claim 3, said ribs being longitudinally coextensive with said one rotary member.

5. Delaminating apparatus according to claim 1, said other rotary member having a higher surface speed than said one rotary member.

* * * * *